Dec. 8, 1953
A. J. KAVANAGH
2,662,187
OPTICAL SYSTEM
Filed July 11, 1951
2 Sheets-Sheet 1
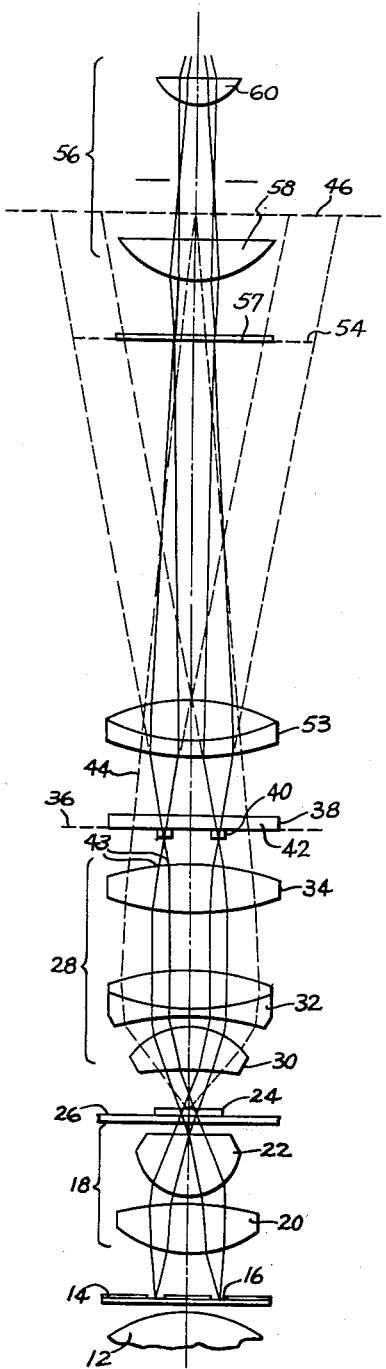
Fig. 1
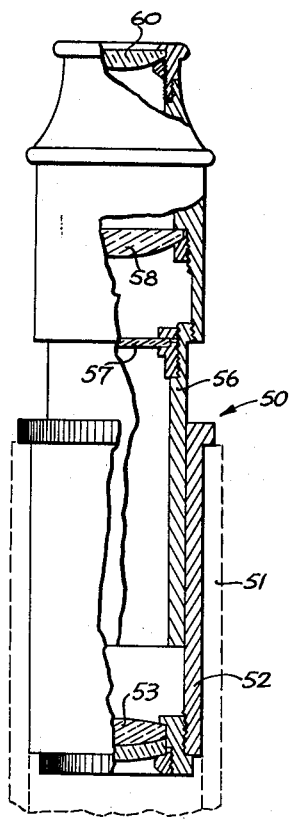
Fig. 2
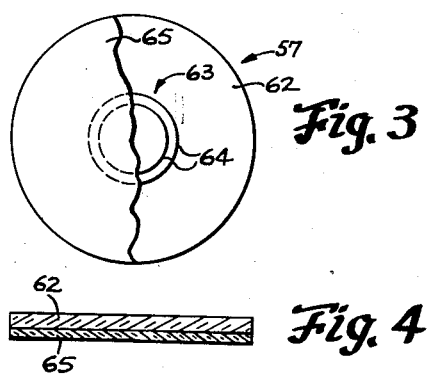
Fig. 3
Fig. 4
INVENTOR
ARTHUR J. KAVANAGH
BY
ATTORNEYS Dec. 8, 1953     A. J. KAVANAGH     2,662,187
OPTICAL SYSTEM Filed July 11, 1951     2 Sheets-Sheet 2

INVENTOR
ARTHUR J. KAVANAGH
BY
ATTORNEYS

Patented Dec. 8, 1953

2,662,187

UNITED STATES PATENT OFFICE 2,662,187

OPTICAL SYSTEM

Arthur J. Kavanagh, Stamford, Conn., assignor to American Optical Company, Southbridge, Mass., a voluntary association of Massachusetts Application July 11, 1951, Serial No. 236,263

2 Claims. (Cl. 250—77)

This invention relates to optical devices and more particularly to devices for use in the accurate adjustment and alignment of conventional and phase contrast microscopes and like optical systems constructed and arranged for use in observing specimens subjected to ultra-violet radiation.

It is well known in microscopy that in order to obtain best results in the use of a conventional microscope the aperture of the objective should be filled with light received from the illumination system of the instrument. This may be accomplished by the user of the conventional microscope when using visible light by observing the aperture of the objective and adjusting the illumination while the eye lens of the instrument is removed. In such a microscope equipped with special optics designed for use with ultra-violet light, however, such a procedure can not be followed. Also in the new and important phase contrast microscope, it is of utmost importance that exact alignment and positioning of the parts of the optical system be provided. However, in this instrument suitably equipped with optics for use with ultra-violet light such alignment and adjustments can not be accomplished in an ordinary manner. Furthermore, for best efficiency such adjustments shoulde be made substantially at the wavelength for which the optics are particularly designed. In an ordinary phase contrast system, light source means of predetermined size and contour and a condenser lens system associated therewith are employed for illuminating a specimen or objects positioned on the stage and in the optical path of the microscope for observation. Optically aligned therewith is an objective and a phase plate having conjugate and complementary zonal areas of light retarding and light absorbing properties, and these areas are generally so positioned with reference to the condenser and objective combination as to be disposed at an image plane of said light source means. Also the conjugate zonal area is of such size, contour and optical properties relative to the complementary portion of the plate that undeviated light illuminating the object under observation is intercepted and altered thereby while deviated light from the specimen is directed by the objective through the complementary zonal area of the phase plate and imaged at the back focal plane of the objective. With such a phase contrast optical system there is generally employed an eye lens system for visual inspection of the specimen being examined.

In such a phase contrast optical system it is of material importance that the aperture means forming the light source of predetermined size and contour for the system be accurately axially aligned and positioned therein in order that the light passing through this aperture will substantially fill the aperture of the objective and in order that the phase plates or phase altering means to be used therewith may be readily and exactly positioned to intercept the undeviated light. When such an optical system is designed for use with visible light it is a comparatively simple matter to remove the eye lens of the microscope and to insert in place thereof a centering telescope of suitable design and focus upon the aperture of the objective (or the exit pupil of the combined system) so as to be able to observe this aperture to see if full and correct illumination is being obtained. At such time the light source means associated with the condenser will be re-imaged at the focal plane of the eye lens of the centering telescope and will be centrally located when in proper adjustment.

However, when a phase contrast microscope is constructed and provided with suitable optics for use in the ultra-violet region of the spectrum, the alignment of the aperture stop or light source means associated with the condenser cannot in the usual manner be inspected in visible light in order to make certain that the light source means adjacent the condenser is properly positioned and that all parts are in proper adjustment. Also image forming optical systems using reflecting objectives and reflecting condenser means are very desirable at times when working with ultra-violet light for they provide a clear path through the system for this light energy which is unobstructed by absorptive refracting lens elements or the like. In such reflecting systems it is likewise desirable for best results to have all optical parts of the system optically aligned and to be able to visibly and readily check such alignment with light at the wavelength at which the system is to normally operate.

Also at times it may be desired to check systems which are intended to operate with ultra-violet light and which employ both reflecting and refracting components in the objective, condensers and such thereof.

The present invention, however, provides means in the form of a centering telescope of special construction and comprising special parts whereby the alignment and adjustment of both conventional and phase contrast optical systems, reflecting, refracting and combined reflecting-refracting systems intended for use with ultra-violet radiation may be readily adjusted and visually observed while employing a light source of a radiation substantially like that for which the optical system is intended in order to obtain best operating conditions therefor.

It is, therefore, an object of the present invention to provide in combination with a conventional microscope having reflecting or refracting or combined reflecting and refracting optics intended for use with ultra-violet light suitable means enabling visual inspection of an image of the aperture of the microscope objective while adjustments and alignment of the parts are being effected and while an ultra-violet light source is being employed therewith.

It is, also, an object of the invention to provide in combination with a phase contrast optical system constructed and arranged for use with ultra-violet light, novel means enabling adjustment and alignment of optical components thereof while using only ultra-violet illumination and while these adjustments are observed in visible light.

It is a further object of the present invention to provide for use with a phase contrast microscope or the like a centering telescope of special construction and embodying a screen and suitable means which may include a reticle whereby ultra-violet radiation being transmitted by optical components of the microscope may be converted into a visible image and the visible image readily inspected by the user of the instrument while alignment and adjustment of parts of the instrument are being made.

It is an additional object of the present invention to provide a centering telescope having suitable refracting or reflecting optical components or a combination of both for transmitting and focusing ultra-violet radiation received thereby upon a viewing screen thereof, suitable means forming a part of said screen for converting ultra-violet radiation into visible radiation, a scale or reticle carried by said screen and additional optical components therein for observing visible light being radiated by said screen and transmitted by said additional components for visual observation while simultaneously absorbing substantially all ultra-violet radiation, if any, passing beyond said screen.

Other objects and advantages of the invention will become apparent from the detailed description which follows when taken in conjunction with the accompanying drawing in which:

Fig. 1 is diagrammatic showing of a phase contrast optical system embodying the present invention;

Fig. 2 is a side elevational view, partly in section, of a refracting type centering telescope embodying the present invention;

Fig. 3 is a bottom plan view, partly broken away, of a screen which may be employed in the optical system of Fig. 2;

Fig. 4 is a cross-sectional view of the screen of Fig. 3;

Figure 6:
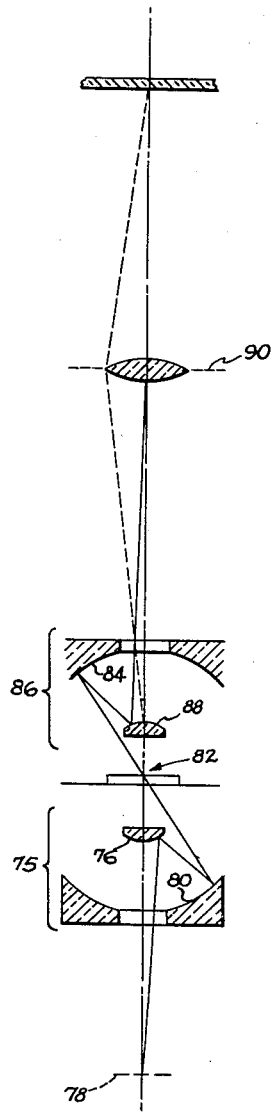
Fig. 6 is a diagrammatic showing of a reflecting type image-forming optical system for a microscope with which the telescope of Fig. 2 or 5 may be used.

Referring to the drawing in detail and particularly Fig. 1, it will be seen that the numeral 10 indicates generally a phase contrast optical system, such as might be employed in a phase microscope, and this system embodies an ultra-violet light source 12 having an aperture plate 14 positioned adjacent thereto. The aperture plate is provided with a light aperture or opening 16 of suitable size and contour, preferably annular, and is so positioned and aligned relative to condenser means 18 embodying lens elements or components 20 and 22 that light from said aperture 16 will be concentrated and directed as a hollow cone of light toward a specimen supporting slide 24 positioned upon a microscope stage 26 for illuminating a specimen or object. Optically aligned with said condenser is objective means 28 comprising lens elements or components 30, 32 and 34 of such optical design that the light passing the object under observation and undeviated thereby will be refracted in a manner so as to be brought to a focus at the exit pupil or conjugate image plane 36 of a combined lens system formed by said condenser and objective means so as to form at this plane an image of said aperture 16. (Obviously all of the light transmitting elements mentioned above will be formed of suitable materials transparent to ultra-violet radiation).

Normally a phase plate 38 having conjugate and complementary zonal areas 40 and 42, respectively, of different absorption and retardation characteristics will be positioned at plane 36 for the purpose of differently altering the ultra-violet light rays 43 imaged at this plane 36 and the light rays 44 deviated by the object under observation and imaged by the objective 28 adjacent a back focal plane of the objective indicated by the numeral 46. The undeviated light passing through the conjugate area of the phase plate 38 and altered or modified thereby and the deviated light passing said phase plate and differently altered or modified thereby will by interference action modify the phase and amplitude so as to alter the contrast effect afforded by the image forming rays at the plane 46 of the object under observation with reference to its surroundings.

When it is desired, however, to accurately position the aperture plate 14 in the optical system of the present invention intended for use in the ultra-violet regions of the spectrum, or to re-check the position thereof during use of the instrument, the "eye lens" or other image forming means intended for use with the instrument will be removed from the body tube thereof. The phase plate 38 may also be removed if desired. In place of the eyepiece a centering telescope of special construction 50 may be inserted in the open end of the body tube indicated by dotted lines at 51 in Fig. 2. This telescope, however, differs from centering telescopes of early constructions in that the objective lens or optical component 53 thereof is formed of ultra-violet transmitting material such as fused quartz, fluorite, lithuium fluoride or the like and is of such refractive characteristics and so positioned in its supporting tube 52 that when the telescope is positioned for use the undeviated light rays 43 passing said image plane 36 will be refracted by a telescope lens system 53 therein and will be brought to a focus at a predetermined image or focal plane 54. Within the tube 52 is slidably positioned an eye lens tube 56 carrying a screen 57 and in the present instance a pair of glass lenses 58 and 60. The screen 57 is of special construction comprising preferably a piece of glass 62 having applied to the lower surface thereof a reticle 63 of any desired configuration and of suitable size, such as a pair of fine concentric circles 64, and a suitable fluorescent coating 65 of sufficient thickness that same will fluoresce and be visible when ultra-violet light is being transmitted through the optical system of the instrument and impinges thereon. The coating, however, is only of such thickness that the fluorescent areas so excited by the radiation may be readily observed from the opposite side or top of the plate and will provide distinct lines of demarcation with reference to other parts of the screen.

The construction is such that when the centering telescope is properly positioned in the instrument the tube 56 may be adjusted vertically so as to place the coating 65 of the screen 57 substantially at the image plane 54 established by lens 53. (The location of plane 54 may vary somewhat when the telescope is being used with different instruments of different makes.) At such time the screen may be observed through the eye lens system, which is always focused upon the plane of the reticle 63 and if ultra-violet light is being transmitted through the instrument an image upon the screen 57 of the aperture 16 will be readily visible and the aperture plate 14 may be readily and accurately adjusted until proper alignment is achieved. Also, if a reticle is present it may help in the accurate adjustment of the parts of the instrument.

The optical properties of the glass plate 62 and the glass lens elements 58 and 60 will be such that substantially all ultra-violet radiation passing beyond the fluorescent coating 65, and which might otherwise be injurious or undesirable to an observer's eye, will be substantially completely absorbed by these glass elements. Or if desired, or necessary, it would be possible to even insert an additional plate, or the like, of suitable transparent filtering material so that substantially all ultra-violet radiation will be removed from the visible light beam prior to reaching the eye of the user of the instrument. In a somewhat similar manner the lighting of the aperture or exit pupil of the objective 28 may be checked and if necessary the condenser adjusted relative thereto into proper alignment while the visual image is being observed upon the screen 57.

While a phase contrast microscope has been disclosed in Fig. 1, the telescope 56 may be in a similar manner employed in a conventional refracting type microscope provided with suitable optics and while using ultra-violet light for aligning the condenser and light source with the aperture of the objective.

Figure 5:
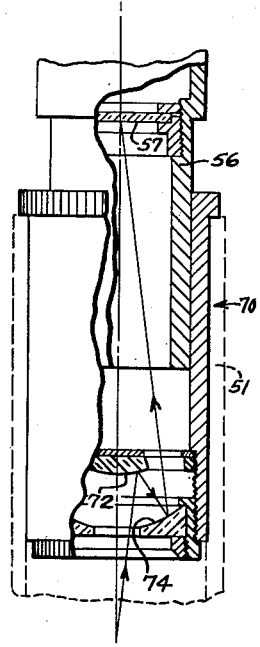
Fig. 5 is a side elevational view, partly in section, of a centering telescope somewhat like that of Fig. 2 but employing reflecting components therein.

In Fig. 5 a modified centering telescope 70 is disclosed in which a pair of reflecting spherical reflecting surfaces 72 and 74, or the like, are employed for directing the ultra-violet light from the objective of the microscope to fluorescent screen 57. In this manner no material absorption of ultra-violet radiation occurs prior to reaching the screen.

In Fig. 6 a reflecting image-forming system for a microscope is disclosed in which a condenser assembly 75 includes a first reflecting surface 76 receiving ultra-violet light from a light source disposed at the plane 78 and directs same, as indicated, toward a second reflecting surface 80. The light is then directed toward an object to be inspected at the point 82. Light from the object 82 is, in a similar manner, directed by a first reflecting surface 84 of a reflecting objective 86 toward a second reflecting surface 88 and then to an image plane 90. Normally the field lens 53 of the centering telescope 50 will be disposed substantially at this plane and will be thus focused upon the reflector 88 while the image thereof will be formed upon the screen 57 as a visible image.

Figure 7:
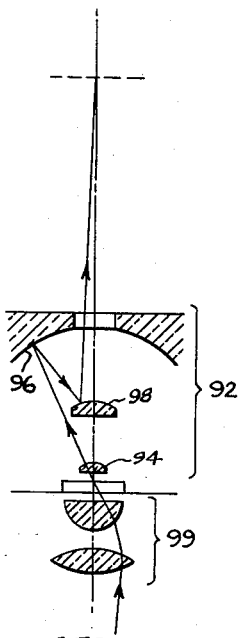
Fig. 7 is a combined refracting and reflecting system which may advantageously employ a telescope of the present invention.

Fig. 7 is much like Fig. 6 but shows a combined reflecting and refracting objective 92 which employs a refracting optical element 94, a first reflecting optical element 96 and a second reflecting optical element 98 in alignment for transmitting ultra-violet radiation. This figure also discloses a refracting type condenser system 99. The alignment of the objectives of both Figs. 6 and 7 with their respective condenser systems may be in like manner readily carried out while employing ultra-violet radiation by the use of an improved centering telescope constructed in accordance with the teachings of the present invention.

Having described my invention I claim:

1. A centering telescope adapted to be inserted into the open upper end of the body tube of a phase contrast microscope equipped with optically aligned ultra-violet light transmitting condenser and objective means, with means forming an ultra-violet light source of predetermined dimensions and contour at the entrance pupil of said microscope and with phase altering means at the exit pupil thereof, and with said phase altering means having optically different zonal areas one of which is a conjugate zonal area of a size and contour substantially equal to the size and contour of the image of said ultra-violet light source formed at said exit pupil, said centering telescope comprising a first tubular part having positioning means thereon for locating said telescope in fixed aligned relation to said body tube, a second tubular part in telescoping relation to said first tubular part, ultra-violet light transmitting image forming means positioned in said first tubular part in fixed relation to said positioning means, a fluorescent screen positioned in said second tubular part in optical alignment with said image forming means, an eye lens carried by said second tubular part at the side of said screen remote from said image forming means, a reticle in said second tubular part adjacent said fluorescent screen and in optical alignment with said image forming means, said eye lens being focused upon said reticule, said second tubular part being axially adjustable relative to said first tubular part for locating said fluorescent screen and reticule substantially at the back focal plane of said image forming means when said last mentioned means is focused upon the conjugate area of said phase altering means, whereby visible images of said light source means and of said conjugate area will be produced upon said fluorescent screen when only ultra-violet light is being transmitted through the said condenser and objective means of said microscope and whereby either said conjugate area or said light source means may be readily adjusted into optical alignment with said reticule while the visible image thereof is being observed through said eye lens.

2. The combination of a phase contrast microscope having supporting means for positioning ultra-violet light transmitting condenser and objective means in optical alignment, means optically aligned therewith forming an ultra-violet light source of predetermined dimensions and contour at the entrance pupil of said condenser and objective means combined and phase altering means at the exit pupil thereof, said phase altering means having optically different zonal areas one of which is a conjugate zonal area of a size and contour substantially equal to the size and contour of the image of said ultra-violet light source formed at said exit pupil, said supporting means comprising a body tube member having an open upper end, a first tubular part having positioning means thereon for locating said first tubular part in fixed aligned relation to said objective means, a second tubular part in telescoping relation to said first tubular part, ultra-violet light transmitting image forming means positioned in said first tubular part in fixed relation to said positioning means, a fluorescent screen positioned in said second tubular part in optical alignment with said image forming means, an eye lens carried by said second tubular part at the side of said screen remote from said image forming means, a reticule in said second tubular part adjacent said fluorescent screen and in optical alignment with said image forming means, said eye lens being focused upon said reticule, said second tubular part being axially adjustable relative to said first tubular part for locating said fluorescent screen and reticule substantially at the back focal plane of said image forming means when said last mentioned means is focused upon the conjugate area of said phase altering means, whereby visible images of said light source means and of said conjugate area will be produced upon said fluorescent screen when only ultra-violet light is being transmitted through said condenser and objective means and whereby either said conjugate area or said light source means may be readily adjusted into optical alignment with said reticule while the visible image thereof is being observed through said eye lens.

ARTHUR J. KAVANAGH.

References Cited in the file of this patent

UNITED STATES PATENTS

| Number | Name | Date |
|---|---|---|
| 1,060,469 | Mach | Apr. 29, 1913 |
| 1,302,353 | Friedrich | Apr. 29, 1919 |
| 1,385,657 | Bell | July 26, 1921 |
| 1,385,696 | Marshall et al. | July 26, 1921 |
| 1,596,328 | Wilt | Aug. 17, 1926 |
| 1,891,348 | Ellinger et al. | Dec. 20, 1932 |
| 2,267,769 | Ardenne | Dec. 30, 1941 |

OTHER REFERENCES

The Polarnet Microscope of Osterbert J. O. S. A. vol. 37 Number 9, pages 726,729.

Ultraviolet Phase Microscopy by Bennett et al. J. O. S. A. vol. 38, pages 739–740 Aug. 1948.